United States Patent [19]

Jones

[11] Patent Number: 4,929,580
[45] Date of Patent: May 29, 1990

[54] PROCESS FOR TREATING CLAY MINERALS

[75] Inventor: Thomas R. Jones, St. Austell, United Kingdom

[73] Assignee: ECC International Limited, United Kingdom

[21] Appl. No.: 368,068

[22] Filed: Jun. 15, 1989

Related U.S. Application Data

[63] Continuation of Ser. No. 171,139, Mar. 16, 1988, abandoned, which is a continuation of Ser. No. 940,544, Dec. 12, 1986, abandoned.

[30] Foreign Application Priority Data

Dec. 9, 1985 [GB] United Kingdom ............... 8531253

[51] Int. Cl.$^5$ .................................................. C04B 33/00
[52] U.S. Cl. ..................................... 501/148; 501/149; 106/487; 241/16
[58] Field of Search ................ 501/148, 149, 487; 106/487; 241/15, 16

[56] References Cited

U.S. PATENT DOCUMENTS

| | | | |
|---|---|---|---|
| 3,925,095 | 12/1975 | Bockmann et al. | 106/300 |
| 4,105,466 | 8/1978 | Kunkle et al. | 501/148 |
| 4,106,949 | 8/1978 | Malden | 501/148 |
| 4,569,920 | 2/1986 | Smith-Johannsen | 501/1 |
| 4,742,105 | 5/1988 | Kelley | 524/447 |
| 4,772,332 | 9/1988 | Nemeh et al. | 501/146 |

FOREIGN PATENT DOCUMENTS

| | | |
|---|---|---|
| 984360 | 2/1965 | United Kingdom . |
| 1463974 | 2/1977 | United Kingdom . |
| 2025914 | 1/1980 | United Kingdom . |

*Primary Examiner*—Brian E. Hearn
*Assistant Examiner*—Andrew Griffis
*Attorney, Agent, or Firm*—Klauber & Jackson

[57] ABSTRACT

There is disclosed a process for treating a clay mineral thereby to change its rheological properties when in aqueous suspension such that the fluidity of the aqueous suspension at a given temperature and percentage by weight of completely deflocculated clay mineral solids in the suspension is increased, which process comprises the steps of mixing with the clay mineral in a plastic state a minor proportion by weight of a water-soluble organic compound having a plurality of basic groups and a number average molecular weight not greater than 1000, and subsequently or simultaneously subjecting the mixture to mechanical working under conditions such that from 25 to 1000 KJ of energy per Kg of dry clay mineral are dissipated in the mixture.

6 Claims, 1 Drawing Sheet

PROCESS FOR TREATING CLAY MINERALS

This application is a continuation, of application Ser. No. 171,139, filed Mar. 16, 1988, now abandoned, which is a continuation of application Ser. No. 940,544 filed 12/12/86 now abandoned.

This invention relates to the treatment of clay minerals and, more particularly but not exclusively, is concerned with a process for treating a clay mineral in order to render the same suitable for use as a pigment in a paper coating composition or as an extender in an emulsion paint. More generally, this invention is concerned with a process for treating a clay mineral so as to change the rheological properties of an aqueous suspension of the clay mineral such that the fluidity (defined as the inverse of the viscosity) of the suspension, at a given temperature and percentage by weight of completely deflocculated treated clay solids in the suspension, is increased when compared with a similar suspension in which the clay solids is not so treated. This increase may conveniently be measured by determining the percentage by weight of completely deflocculated treated clay solids in an aqueous suspension at a specific viscosity and given temperature, for example at a viscosity of 500 mPa.s at 22° C., and comparing the value obtained with that found using clay mineral which has not been treated in accordance with the present invention.

GB-1481307 describes a process in which an aqueous suspension of a clay mineral at a solids content in the range of from 5 to 30% by weight and a pH of from 2.8 to 7.5 is mixed with a minor proportion by weight of a water-soluble organic compound having a plurality of basic groups and a number average molecular weight not greater than 1000. The fluidity of the aqueous suspension at a given temperature and percentage by weight of completely deflocculated clay mineral solids in the suspension can thereby be increased. A further increase in the fluidity of the clay mineral when in aqueous suspension can be obtained by subjecting the clay mineral, after treatment as described above, to mechanical working in, for example, an auger-type pugmill, a Z-blade mixer, an edge-runner mill or a similar machine for working plastic materials, and preferably under conditions which result in the dissipation in the treated clay mineral of from 25 to 1000 kJ of energy per kg of dry clay mineral.

Whilst the process described in GB-1481307 has been found to be effective in improving the high solids fluidity of a clay mineral when in aqueous suspension, it has also been found that the filtering properties of an aqueous suspension of a clay mineral treated by the process are affected. The permeability of the filter cake formed by filtering an aqueous suspension of a clay mineral treated by the process was found to be increased, as compared with that of an untreated clay mineral, so that filtration proceeded more rapidly at a given pressure differential, but the water content of the filter cake was also increased with the result that a larger quantity of water had to be removed by a subsequent thermal drying step which increased the overall cost of the process. A further problem is that the water-soluble organic compound has a flocculating effect on the clay mineral so that the suspension of the clay mineral becomes more viscous and therefore more difficult to pump and to screen.

According to a first aspect of the present invention there is provided a process for treating a clay mineral, which comprises the step of mixing with the clay mineral in a plastic state a minor proportion by weight of a water-soluble organic compound having a plurality of basic groups and a number average molecular weight not greater than 1000, and subsequently or simultaneously subjecting the mixture to mechanical working under conditions such that from 25 to 1000 kJ of energy per kg of dry clay mineral are dissipated in the mixture.

The treated clay mineral may be thermally dried after mechanical working.

According to a second aspect of this invention there is provided an aqueous suspension of a clay mineral treated in accordance with the process of the first aspect of this invention. Preferably, the aqueous suspension has a dry clay mineral content of at least 55% by weight.

The process of the invention can be applied, for example, to clay minerals of the kandite group, for example kaolinite, dickite, nacrite and halloysite, or to clay minerals of the smectite group, for example montmorillonite, beidellite and saponite, or to mica-like clay mineral, such as illite. The clay mineral in the plastic state will generally contain from 22% to 50% by weight of water. It has been found that the best results are obtained when the clay mineral in the plastic state contains from 23% to 28% by weight of water. The organic compound may be added to the clay mineral in the form of a substantially pure, undiluted liquid, but in some cases it may be more convenient to form a solution of the organic compound in water and to spray the solution on to the clay mineral.

The water-soluble organic compounds which are used in the process of the invention may be described as polyacidic organic bases, and are preferably compounds of carbon, hydrogen and nitrogen only and are free of other functional groups, such as hydroxy or carboxylic acid groups, which would increase their solubility in water and thus increase the likelihood of their being desorbed from the clay mineral in an aqueous suspension. Preferably, the organic compound is polyethyleneimine (PEI) having a number average molecular weight in the range 200 to 1000, but useful results may also be obtained with other polyamines, for example ethylenediamine, diethylenetriamine, tetraethylenepentamine, hexamethylenetetramine, and 1:12 dodecanediamine, and cationic polyacrylamides. A further example of a water-soluble organic compound which may be employed is a polyethylene diamine which may be a copolymer of ethylene diamine with an ethylene dihalide or with formaldehyde. Two or more of the water-soluble organic compounds may be used together if desired. It has been found that the quantity of the water-soluble organic compound used is preferably in the range from 0.01 to 0.25% by weight, based on the weight of dry clay mineral. If more than 0.25% by weight of the organic compound is used the effect is generally to increase, rather than to reduce, the viscosity at the given solids content of an aqueous suspension of the clay mineral.

The mixture of the clay mineral in the plastic state and the organic compound is preferably subjected to mechanical working in an auger-type pugmill, but other machines which can exert a shearing effect on a plastic material, such as a Z-blade mixer or a roller pan mixer, may also be used.

The process of the present invention has the following advantages as compared with the process described in GB-1481307.

Firstly, the apparatus required is simpler and of lower capital cost since, in order to introduce a water-soluble organic compound having a plurality of basic groups and a number average molecular weight not greater than 1000, such as PEI, into the kaolin clay it is necessary only to provide a simple dose pump which, for example, dribbles a 50% by weight PEI solution into the feed hopper of a pugmill.

Secondly, it is known that, to run filter presses cost effective manner, it is necessary to thicken a clay suspension to a specific gravity of about 1.150 (a solids content of about 21% by weight). After thickening to such a consistency, as is necessary with the process described in GB-1481307, a clay suspension, especially one which has been treated with PEI, for example, becomes very thick and may be difficult to pump out of holding tanks and into filter presses. The prior art technique is therefore associated with problems of handling, pumping and screening a viscous suspension of PEI-treated clay which are avoided in the process of the present invention.

Thirdly, it is not essential, in the process of the present invention, to dry by thermal evaporation, filter press cakes of relatively high water content, such as are formed by the wet process. Thus, a typical water content for a filter cake which has been formed by dewatering a kaolin suspension in a filter press at a pressure differential of 120 psi (1.03 MPa) is 33% by weight of water. If, however, the kaolin suspension had first been treated with PEI, for example, the water content of the filter cake would be 36% by weight. It is generally required to dry the kaolin to about 10% by weight for transport and sale. At 33% by weight water, 100 g of dry clay is associated with 49.25 g water; at 36% by weight water, 100% of dry clay is associated with 56.25 g water; and at 10% by weight water, 100 g of dry clay is associated with 11.11 g water. Hence, it can be seen that if the initial water content of the cake is 36% by weight it is necessary to evaporate 18% by weight more water than if the initial water content is 33% by weight. This means that the dry kaolin throughput of the drying installation is reduced by 18% and the fuel consumption is increased by 18%. These disadvantages are avoided by the process of the present invention because the fluidity of the aqueous suspension at a given temperature and percentage by weight of completely deflocculated clay mineral solids in the suspension is increased without affecting appreciably the water content of the kaolin/water mixture which must be thermally dried. The water content of filter cakes formed by dewatering by filter pressing at a pressure differential of 1.03 MPa kaolin clay suspensions which have been treated with different amounts of PEI in accordance with the process described in GB-1481387 is as follows:

| % by weight of dry PEI based on the weight of dry kaolin | Water content of filter cake (% by weight) |
| --- | --- |
| 0 | 37.1 |
| 0.025 | 39.1 |
| 0.05 | 40.0 |
| 0.1 | 40.6 |

While the process described in GB-1481307 is effective in increasing the high solids fluidity of a kaolin/water suspension, it has the disadvantage of increasing the quantity of water which must be evaporated during the preparation of the clay product. This disadvantage is avoided by the process of the present invention since the water-soluble organic compound is added to the clay mineral in a plastic state, i.e. after filter pressing.

Heretofore, it has been considered essential to add the water soluble organic compound having a plurality of basic groups and a number average molecular weight not greater than 1000 directly to an aqueous suspension of the clay, which suspension is then dewatered by, for example, a filter press before mechanical working. Surprisingly, it has now been found that the water soluble organic compound can be mixed with a clay mineral in the plastic state and, unexpectedly, that the mechanical mixing in the plastic state is sufficiently thorough to give a substantially uniform distribution of the organic compound in the body of the clay mineral thereby to effect a significant increase in the fluidity of the aqueous suspension at a given temperature and percentage by weight of completely deflocculated clay mineral solids in the suspension.

For a better understanding of the present invention, reference will now be made, by way of example, to the accompanying drawings in which.

Figure 1:
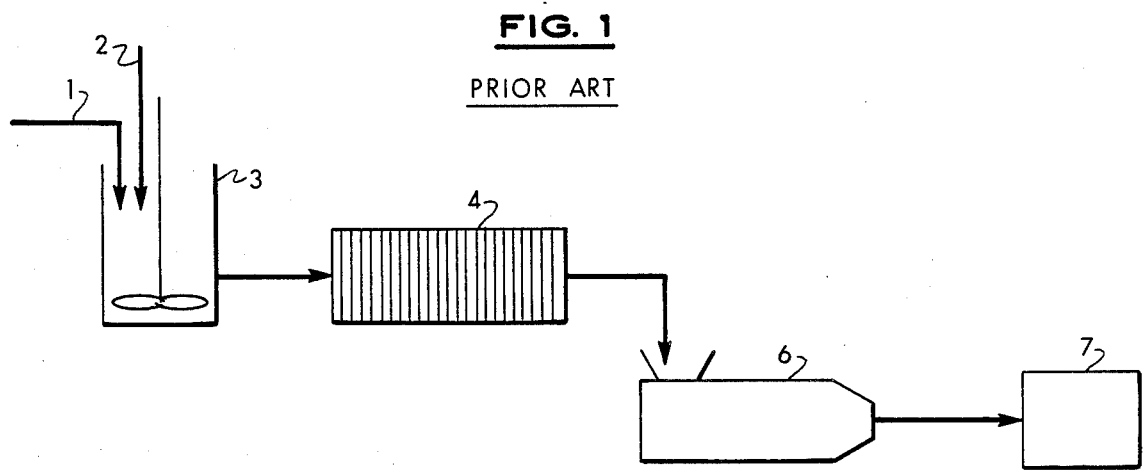
FIG. 1 is a diagrammatic flow chart of the process of GB-1481307.
Figure 2:
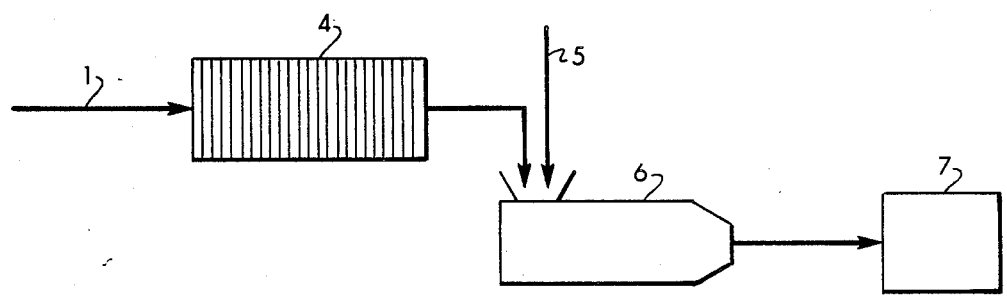
FIG. 2 is a diagrammatic flow chart of a process in accordance with the present invention.

In both FIGS. 1 and 2, an aqueous suspension of a paper coating grade kaolin clay at a solids content in the range of from 5 to 30% by weight is introduced through a conduit 1 and is dewatered by means of a filter press 4 to form a cake having a plastic consistency and a water content in the range of from about 22% to about 35% by weight. The filter cake is conveyed to an auger-type pugmill 6 which extrudes the plastic material to form vermiform pieces which are thermally dried in a dryer 7.

In FIG. 1, an additional mixing tank 3 situated upstream of the filter press is required to which an aqueous solution of the organic compound is fed through a conduit 2 to be mixed with the aqueous suspension of clay mineral. It is necessary also to provide equipment (not shown) which will measure continuously the percentage by weight of solids of the suspension entering through conduit 1 into the tank 3 so that the solution of the organic compound can be metered accurately into the mixing tank 3 to give the precise optimum dose of organic compound which is required.

In FIG. 2, an aqueous solution of the organic compound is fed directly into the auger-type pugmill 6 through a conduit 5. The rate of production of cake by the filter press 4 and the water content of the cake remain substantially constant and less sophisticated metering equipment is therefore necessary to ensure that the optimum dose of the organic compound is maintained.

The invention is illustrated by the following Examples.

EXAMPLE 1

A paper coating grade kaolin clay having a particle size distribution such that 75% by weight consisted of particles having an equivalent spherical diameter smaller than 2 microns was prepared from raw kaolin by a process comprising the steps of forming a suspension in water of the raw kaolin, subjecting the kaolin in suspension to particle size classification, dewatering the suspension of fine kaolin particles in a filter press to form a cake containing about 34% by weight of water, and mixing with the cake a proportion of the same grade of kaolin clay which had been thermally dried to a water content of about 10% by weight such that the water content of the mixture was about 25% by weight.

Samples of this mixture were then passed through a laboratory auger-type pugmill under different conditions such that different amounts of energy were dissipated in the mixture per kilogram of dry kaolin.

Two samples were subjected to mechanical working in the pugmill for each amount of energy dissipated. To the first sample there was added 0.18% by weight, based on the weight of dry kaolin, of a 50% by weight aqueous solution of an unneutralised polyethyleneimine (PEI) having a number average molecular weight of 400, but no polyethyleneimine was added to the second sample.

For each sample treated as described above there was determined the solids content of a deflocculated aqueous suspension of the sample which had a viscosity of 500 mPa.s, as measured by a Brookfield Viscometer at 22° C. using Spindle No. 3 at a speed of 100 rpm.

A sample containing 100 g of dry kaolin was taken. 65 g of the dry kaolin was added to a mixing vessel containing that quantity of a solution of sodium hexametaphosphate and sodium hydroxide which had been found by experiment to provide a deflocculated suspension of the kaolin of minimum viscosity and sufficient water to form a suspension having a solids content, measured as a percentage by weight of solids, which was about 3 percentage points higher than the percentage by weight of solids of a suspension of the same kaolin sample which would just flow from the end of a glass rod. The mixture was stirred by means of a laboratory mixer rotating at 1420 rpm for a total of 25,000 revolutions. The remaining 35 g of the 100 g dry kaolin sample was added as the stirring proceeded. At the completion of the mixing operation the contents of the mixing vessel were cooled to 22° C. and the viscosity measured. Further water was then added to reduce the percentage by weight of solids by about 2 units, and the suspension was stirred with a stirring rod until homogeneous, the temperature adjusted to 22° C. if necessary and the viscosity measured again. Finally, the solids content of the suspension was determined by weighing a small sample of the suspension before and after evaporation to dryness. A straight line relationship exists between percentage solids content and the reciprocal of the square root of the viscosity in mPa.s. The percentage solids content was plotted against the reciprocal square root of the viscosity and the solids content at which the straight line joining the two experimental points intersected the 500 mPa.s line was recorded. The results obtained are set forth in Table 1 below:

TABLE 1

| Energy dissipated in the plastic kaolin (KJ.Kg$^{-1}$) | % by weight of solids for 500 mPa.s. viscosity at 22° C. | |
|---|---|---|
| | With PEI | Without PEI |
| 0 | 69.0 | 67.7 |
| 54 | 70.0 | 69.4 |
| 72 | 70.3 | 69.7 |
| 108 | 70.7 | 70.2 |
| 144 | 71.0 | 70.5 |
| 180 | 71.2 | 70.8 |
| 234 | 71.5 | 71.0 |

EXAMPLE 2

Four paper coating grade kaolin clays, A, B, C and D, were treated in a commercial-scale auger type pugmill at a water content of about 25% by weight. Clay A had a particle size distribution such that 80% by weight consisted of particles having an equivalent spherical diameter smaller than 2 microns, while clays B, C and D had a particle size distribution such that 75% by weight consisted of particles having an equivalent spherical diameter smaller than 2 microns. For each clay, pairs of runs were performed, the amount of energy dissipated in the clay in the plastic state being the same in each run in the pair, but in one run 0.09% by weight, based on the weight of dry kaolin, of the same polyethyleneimine as was used in Example 1 was added to the kaolin, while the other run was performed in the absence of polyethyleneimine.

For each kaolin sample the percentage by weight of solids in the aqueous suspension which had a viscosity of 500 mPa.s at 22° C. was determined as described in Example 1 above and the results obtained are set forth in Table II below:

TABLE II

| | % by weight of solids for 500 mPa.s viscosity at 22° C. | |
|---|---|---|
| Clay | With PEI | Without PEI |
| A | 70.0 | 68.0 |
| B | 71.5 | 70.5 |
| C | 71.4 | 70.7 |
| D | 72.0 | 70.8 |

EXAMPLE 3

A paper coating grade kaolin clay having a particle size distribution such that 70% by weight consisted of particles having an equivalent spherical diameter smaller than 2 microns was prepared from raw kaolin by a process comprising the steps of forming a suspension in water of the raw kaolin, subjecting the kaolin in suspension to particle size classification, dewatering the suspension of fine kaolin particles in a filter press to form a cake containing about 25% by weight of water and treating the cake in a commercial auger-type pugmill.

There was added to batches of the cake passing through the pugmill an organic compound which was either (a) polyethylene imine (PEI) or (b) a polyethylene diamine (PEA) which is a copolymer of ethylene diamine with ethylene dichloride and has a molecular weight of about 200, each organic compound being added at two different dose rates.

For each sample of treated plastic kaolin the percentage by weight of dry solids in the aqueous suspension which has a viscosity of 500 mPa.s at 22° C. was determined as described in Example 1 above. As a comparison, the rheological properties of the untreated filter press cake were also determined in the same way.

The results obtained are set forth in Table III below:

TABLE III

| Organic compound | % by wt of organic compound based on wt. of dry solids | % by weight of solids for 500 mPas viscosity at 22° C. |
|---|---|---|
| Untreated filter press cake | | 66.0 |
| No chemical treatment, pugmilled only | | 70.3 |
| PEI | 0.04 | 71.3 |
| PEI | 0.08 | 71.4 |
| PEA | 0.08 | 71.2 |

TABLE III-continued

| Organic compound | % by wt of organic compound based on wt. of dry solids | % by weight of solids for 500 mPas viscosity at 22° C. |
| --- | --- | --- |
| PEA | 0.15 | 72.4 |

EXAMPLE 4

A paper coating grade kaolin clay having a particle size distribution such that 75% by weight consisted of particle having an equivalent spherical diameter smaller than 2 um was prepared from raw kaolin by a process comprising the steps of forming a suspension in water of the raw kaolin, subjecting the kaolin in suspension to particle size classification, dewatering the suspension in a filter press and mixing with the cake thus formed a proportion of the same grade of kaolin clay which had been thermally dried to give a mixture containing 25% by weight of water. To this mixture there was added, in an auger-type pugmill, 0.09% by weight, based on the weight of dry kaolin, of an unneutralised polyethyleneimine having a number average molecular weight of 400. About 108 KJ of energy, per Kg of dry kaolin, were dissipated in the mixture. The mechanically worked mixture was transferred to a blunger to which were also added 0.05% by weight of a sodium polyacrylate dispersing agent having a number average molecular weight of 1650 and 0.25% by weight of tetrasodium pyrophosphate, both based on the weight of dry kaolin clay, and sufficient sodium hydroxide to raise the pH to 8.5. In the blunger the mixture was transformed as a result of the addition of deflocculating chemicals and of the stirring into a fluid suspension. Samples of this suspension were taken and each sample was subjected to stirring in the laboratory mixer described in Example 1 for a total of 25,000 revolutions. The percentage by weight of dry kaolin in a suspension having a viscosity of 500 mPa.s at 22° C. was then determined by the method described in Example 1. The arithmetic mean of the results for all the samples gave a value of 71.3% by weight.

The experiment was repeated exactly as described above, except that in this case no polyethyleneimine was used. The arithmetic means of the results gave a value of 70.6% by weight.

I claim:

1. In the process for preparing a clay mineral which provides reduced viscosity when formed into an aqueous completely deflocculated paper coating suspension of a given solids content; which process includes the steps of (1) preparing a slurry of the clay mineral at 5 to 30% solids; (2) mixing the slurry and thereby said clay mineral with a minor proportion by weight of a water-soluble organic compound which is free of hydroxy or carboxylic acid groups and has a plurality of basic groups and a number average molecular weight not greater than 1000; (3) dewatering the mixed slurry to yield a filter cake of the clay mineral having a plastic consistency; (4) mechanically working the filter cake while in a plastic state containing from 22% to 50% by weight water, under conditions such that from 25 to 1000 KJ of energy per Kg of dry clay mineral are dissipated in the mixture; and (5) thermally drying the product from said mechanical working; THE IMPROVEMENT COMPRISING:

displacing the point of addition of said water-soluble organic compound to said mechanical working step (4), and effecting mixing of said compound and clay simultaneously with said working; thereby combining said mixing and working steps; said displacement of said addition point for said water-soluble organic compound acting further to reduce water retention in the said filter cake, thereby to reduce the quantity of heat energy required during said thermal drying step.

2. A process according to claim 1, wherein the clay mineral is kaolinite, dickite, nacrite, halloysite, montmorillonite, beidellite, saponite, or illite.

3. A process according to claim 1, wherein the clay mineral in the plastic state contains from 23% to 28% by weight of water.

4. A process according to claim 1, wherein the water-soluble organic compound is a polyethyleneimine having a number average molecular weight in the range 200 to 1000.

5. The process as set forth in claim 1 in which the organic compound is selected from the group consisting of polyethylene imine, ethylene diamine, 1:2 dodecane diamine, diethylene triamine, tetraethylene pentamine, hexamethylene tetramine, cationic polyacrylamides and a copolymer of ethylene diamine with an ethylene dihalide or with formaldehyde.

6. The product as set forth in claim 1 in which the organic compound is selected from the group consisting of polyethylene imine, ethylene diamine, 1:2 dodecane diamine, diethylene triamine, tetraethylene pentamine, hexamethylene tetramine, cationic polyacrylamides and a copolymer of ethylene diamine with an ethylene dihalide or with formaldehyde.

* * * * *